US010495782B2

United States Patent
Dupuy et al.

(10) Patent No.: US 10,495,782 B2
(45) Date of Patent: Dec. 3, 2019

(54) SYSTEM, METHOD AND COMPUTER PROGRAM PRODUCT FOR DETERMINING PLACEMENT OF PERFORATION INTERVALS USING FACIES, FLUID BOUNDARIES, GEOBODIES AND DYNAMIC FLUID PROPERTIES

(71) Applicant: Landmark Graphics Corporation, Houston, TX (US)

(72) Inventors: Alain Dupuy, Pau (FR); Travis St. George Ramsay, Rosenberg, TX (US); Steven Paul Crockett, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 686 days.

(21) Appl. No.: 14/441,491

(22) PCT Filed: Dec. 13, 2012

(86) PCT No.: PCT/US2012/069515
§ 371 (c)(1),
(2) Date: May 7, 2015

(87) PCT Pub. No.: WO2014/092712
PCT Pub. Date: Jun. 19, 2014

(65) Prior Publication Data
US 2015/0276978 A1    Oct. 1, 2015

(51) Int. Cl.
*G01V 99/00*    (2009.01)

(52) U.S. Cl.
CPC ................. *G01V 99/005* (2013.01)

(58) Field of Classification Search
CPC ........................... G01V 99/005; E21B 43/119
See application file for complete search history.

(56) References Cited

U.S. PATENT DOCUMENTS

| | | |
|---|---|---|
| 5,757,663 A | 5/1998 | Lo et al. |
| 6,549,879 B1 | 4/2003 | Cullick et al. |
| 7,565,243 B2 | 7/2009 | Kim et al. |
| 8,200,465 B2 | 6/2012 | Suarez-Rivera et al. |
| 2002/0088618 A1* | 7/2002 | Ramakrishnan ...... E21B 47/042 166/250.02 |
| 2004/0220790 A1* | 11/2004 | Cullick .................. G06Q 10/06 703/10 |
| 2010/0125349 A1* | 5/2010 | Abasov .................. E21B 43/00 700/90 |
| 2010/0149917 A1* | 6/2010 | Imhof .................... G01V 1/345 367/53 |

(Continued)

OTHER PUBLICATIONS

International Search Report and The Written Opinion of the International Searching Authority, or the Declaration, dated Feb. 20, 2013, PCT/US2012/069515, 11 pages. ISA/US.

(Continued)

*Primary Examiner* — Mushfique Siddique
(74) *Attorney, Agent, or Firm* — Haynes and Boone, LLP (57) ABSTRACT

A system and method utilizing one or more perforation filters to determine the location of perforation intervals along a well trace within a reservoir model. The filters may define the location of the perforation intervals based upon, for example, rock property, facies, fluid boundary, geobody, or dynamic fluid property.

13 Claims, 6 Drawing Sheets

(56) References Cited

U.S. PATENT DOCUMENTS

| | | |
|---|---|---|
| 2010/0179797 A1 | 7/2010 | Cullick et al. |
| 2010/0185427 A1 | 7/2010 | Tilke et al. |
| 2011/0060572 A1 | 3/2011 | Brown et al. |
| 2011/0060573 A1 | 3/2011 | Cullick et al. |
| 2011/0099132 A1* | 4/2011 | Fruehbauer ............ G01V 11/00 706/12 |
| 2011/0174487 A1* | 7/2011 | Burleson ............ E21B 43/1195 166/298 |
| 2012/0150501 A1 | 6/2012 | Wu |
| 2012/0185225 A1 | 7/2012 | Onda et al. |
| 2015/0301224 A1* | 10/2015 | Ramsay ............... G01V 99/005 702/6 |

OTHER PUBLICATIONS

Renard et al., "Connectivity Metrics for Subsurface Flow and Transport," Advance in Water Resources, Dec. 13, 2011, pp. 168-196, vol. 51.

Cipolla, et al. "New Algorithms and Integrated Workflow for Tight Gas and Shale Completions," *Society of Petroleum Engineers Annual Technical Conference and Exhibition*, Oct. 30-Nov. 2, 2011, Denver, Colorado, USA.

Extended European Search Report issued for EP 12890006, dated Jul. 28, 2016, 9 pages.

\* cited by examiner

SYSTEM, METHOD AND COMPUTER PROGRAM PRODUCT FOR DETERMINING PLACEMENT OF PERFORATION INTERVALS USING FACIES, FLUID BOUNDARIES, GEOBODIES AND DYNAMIC FLUID PROPERTIES

The present application is a U.S. National Stage patent application of International Patent Application No. PCT/US2012/069515, filed on Dec. 13, 2012, the benefit of which is claimed and the disclosure of which is incorporated herein by reference in its entirety.

FIELD OF THE INVENTION

The present invention relates generally to hydrocarbon reservoir modeling and, more specifically, to a system which determines placement of perforation intervals along a well trace within a reservoir model using a variety of perforation filters.

BACKGROUND

The economic viability of a conventional reservoir is determined by the abundance and spatial distribution of porosity, as well as permeability. Unconventional reservoirs, on the other hand, typically have poorer porosity and permeability as compared to conventional reservoirs. Such unconventional reservoirs comprise, for example, shale or tight gas sand, or may even possess highly permeable rock types, yet have an egregiously viscous hydrocarbon component that must be mined or aggressively heated to induce flow (i.e., viscosity reduction). In addition, both conventional and unconventional reservoirs are contained by seals (cap rock) of even further diminished petrophysical property.

In view of the foregoing, there is a need in the art for a methodology to distinguish between cells coincident with the interpretation of economic and non-economic reservoir properties in order to determine the location of perforation intervals along a well trace. In order to ascertain viable connected reservoir cells over a range of petrophysical properties, user discretion of net reservoir constituents is necessary, which requires well log interpretation and rock physics-based property derivation. Once the viable connected cells are identified, the location of perforation intervals may be strategically placed along a well trace. Accordingly, the present invention meets these and other needs as described below.

DESCRIPTION OF ILLUSTRATIVE EMBODIMENTS

Illustrative embodiments and related methodologies of the present invention are described below as they might be employed in a system utilizing a variety of perforation filters to determine the location of one or more perforation intervals along a well trace. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
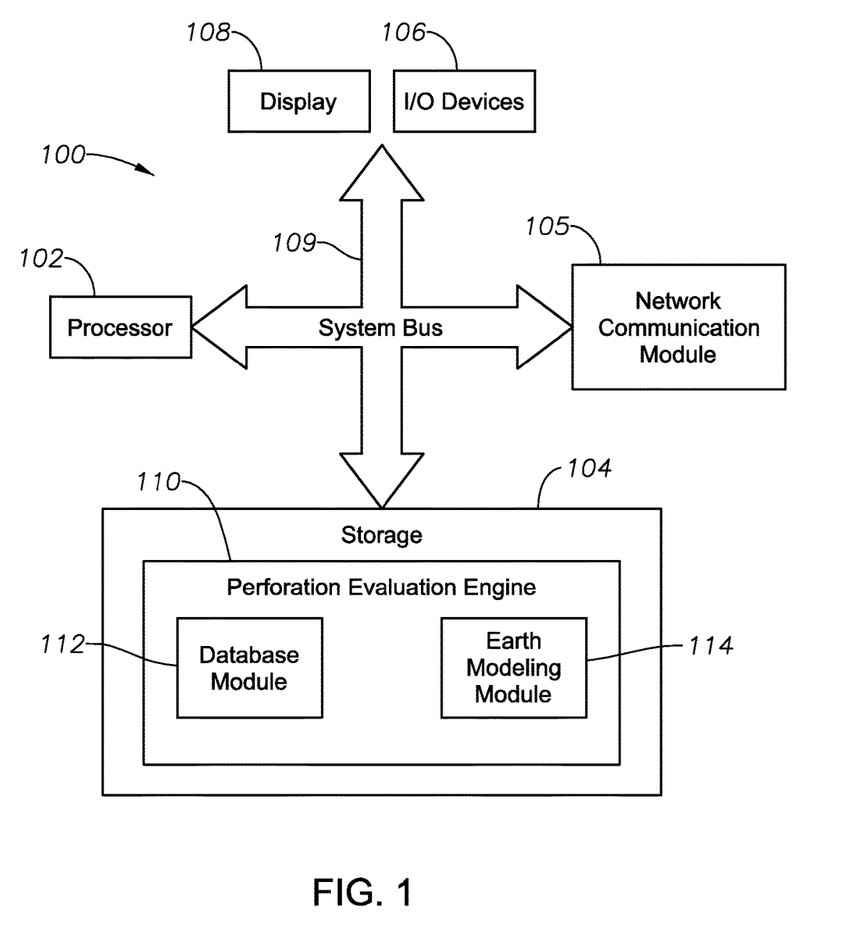
FIG. 1 illustrates a block diagram of a perforation evaluation system according to certain exemplary embodiments of the present invention.

FIG. 1 shows a block diagram of a perforation evaluation system 100 according to certain exemplary embodiments of the present invention. As will be described herein, exemplary embodiments of the present invention determine the location of perforation intervals along a well trace using one or more distinct perforation filters. Such filters include, for example, perforation by rock property (petrophysical or mechanical), perforation by facies (or rock type), perforation by fluid boundary, perforation by connected volume index (or "geobody"), and perforation by dynamic fluid property. Each category represents a distinct filter that may be utilized individually or in combination with one or more other filters. To achieve the foregoing objectives, exemplary embodiments of the present invention intelligently analyze a static or dynamic earth model to locate perforation intervals along the well trace which intersect with grid cells comprising geological characteristics defined by the perforation filters. Thereafter, the resulting model, including the perforation intervals, is presented to a dynamic simulator to model a variety of reservoir operations. Accordingly, the location and amount of the perforation intervals along the well trace is optimized.

Referring to FIG. 1, exemplary perforation evaluation system 100 includes at least one processor 102, a non-transitory, computer-readable storage 104, transceiver/network communication module 105, optional I/O devices 106, and an optional display 108 (e.g., user interface), all interconnected via a system bus 109. Software instructions executable by the processor 102 for implementing software instructions stored within perforation evaluation engine 110 in accordance with the exemplary embodiments described herein, may be stored in storage 104 or some other computer-readable medium. Although not explicitly shown in FIG. 1, it will be recognized that perforation evaluation system 100 may be connected to one or more public and/or private networks via one or more appropriate network connections. It will also be recognized that the software instructions comprising perforation evaluation engine 110 may also be loaded into storage 104 from a CD-ROM or other appropriate storage media via wired or wireless methods.

Moreover, those ordinarily skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof in a computer system or other processing system.

Still referring to FIG. 1, in certain exemplary embodiments, perforation evaluation engine 110 comprises database module 112 and earth modeling module 114. Database module 112 provides robust data retrieval and integration of historical and real-time reservoir related data that spans across all aspects of the well planning, construction and completion processes such as, for example, drilling, cementing, wireline logging, well testing and stimulation. Moreover, such data may include, for example, logging data, well trajectories, petrophysical rock property data, mechanical rock property data, surface data, fault data, data from surrounding wells, data inferred from geostatistics, etc. The database (not shown) which stores this information may reside within database module 112 or at a remote location. An exemplary database platform is, for example, the INSITE® software suite, commercially offered through Halliburton Energy Services Inc. of Houston Tex. Those ordinarily skilled in the art having the benefit of this disclosure realize there are a variety of software platforms and associated systems to retrieve, store and integrate the well related data, as described herein.

Still referring to the exemplary embodiment of FIG. 1, perforation evaluation engine 110 also includes earth modeling module 114 to integrate with the data contained within database module 112 in order to provide subsurface stratigraphic visualization including, for example, geo science interpretation, petroleum system modeling, geochemical analysis, stratigraphic gridding, facies, net cell volume, and petrophysical property modeling. In addition, earth modeling module 114 models well traces, perforation intervals, as well as cross-sectional through the facies and porosity data. Exemplary earth modeling platforms include, for example, DecisionSpace®, as well as its PerfWizard® functionality, which is commercially available through the Assignee of the present invention, Landmark Graphics Corporation of Houston, Tex. However, those ordinarily skilled in the art having the benefit of this disclosure realize a variety of other earth modeling platforms may also be utilized with the present invention.

Moreover, perforation evaluation engine 110 may also include multi-domain workflow automation capabilities that may connect any variety of desired technical applications. As such, the output from one application, or module, may become the input for another, thus providing the capability to analyze how various changes impact the well placement and/or fracture design. Those ordinarily skilled in the art having the benefit of this disclosure realize there are a variety of workflow platforms which may be utilized for this purpose.

Figure 2:
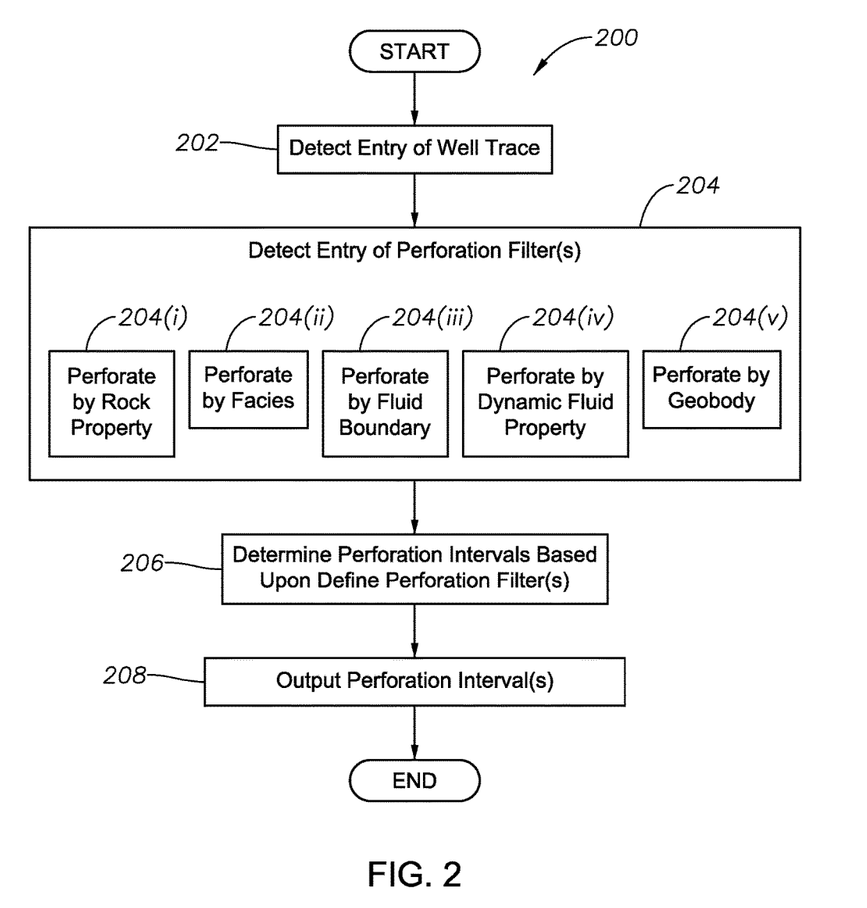
FIG. 2 illustrates a method for determining the location of perforation intervals according to certain exemplary methodologies of the present invention.

Referring to FIG. 2, exemplary methodologies of the present invention will now be described. Referring to method 200, at block 202, perforation evaluation engine 110 detects entry of a statically defined well trace within the reservoir model simulated by earth modeling module 114. Such entry may be entered into a graphical user interface, for example, using a collection of coordinate that depict the spatial trajectory of the well trace along the subsurface, as understood in the art. In an exemplary embodiment, once defined, perforation evaluation engine 110 will then utilize the well trace as the basis for the remainder of the simulation in which the perforation filters will be applied. Accordingly, perforation evaluation system 100 will optimize the placement of perforation intervals in a planned or existing well. However, in an alternate embodiment, the well trace may not be defined and, instead, perforation evaluation system 100 utilizes only the perforation filters described herein to determine the location of a well trace and its perforation intervals, as will be readily understood by those ordinarily skilled in the art having the benefit of this disclosure.

At block 204, perforation evaluation engine 110 then detects entry of one or more perforation filters entered via a user interface such as, for example, a graphical user interface, as understood in the art. In certain exemplary embodiments, the perforation filters include, for example, perforation by rock property (204($i$)), perforation by facies (204($ii$)), perforation by fluid boundary (204($iii$)), perforation by geobody (204($iv$)), and perforation by dynamic fluid property (204($v$)). Once one or more of the perforation filters have been detected, perforation evaluation engine 110 then analyzes the reservoir model for cells meeting the criteria defined by the perforation filters. Ultimately, the perforation intervals are placed along the sections of the well trace comprising those cells meeting the criteria defined by the perforation filters.

The perforation by rock property filter may be defined using any provided rock property volume (petrophysical and/or mechanical). In this example, however, it will be described with relation to petrophysics as the filtering criterion. However, those ordinarily skilled in the art having the benefit of this disclosure will realize the same logic holds for mechanical rock properties. Here, perforation evaluation engine 110 applies petrophysical property filtering by automatically identifying where the well trace intersects with cells in the specified volume. In addition, those intersected cells must be within a petrophysical data range expressly defined via a user interface at block 204($i$). In other words, the filter requires well path cell intersections and that the grid cell contains petrophysical properties in the filter range (in terms of porosity and/or permeability). For example, the petrophysical filter would be bounded by a data range (minimum and maximum data values existing for each property, for example). In the case of petrophysical properties, it is not necessary to designate filter ranges for both porosity and permeability. As such, in certain embodiments, one property may be used in the filter while the other is omitted. Ultimately, perforation evaluation engine 110 determines those perforation locations along the defined well trace and that comprise the defined porosity or permeability data range.

Now referring to block 204(ii), a perforation by facies filter may be defined by stipulating facies as the filtering property via the user interface. As such, perforation evaluation engine 110 then detects such entry and, as a result, determines one or more locations along the well trace intersections with cells that have the defined facies, or rock type. In other words, to meet the criteria of this defined filter, perforation evaluation engine 110 traverses the reservoir model to locate those cells that intersect the well trace and that comprise the defined rock type (delta, crevasse splay, channel sand, etc., for example). In addition, the facies filter may be bounded, for example, by those defined in the lithotype definition of an earth modeling session, as will be understood by those ordinarily skilled in the art having the benefit of this disclosure. Accordingly, through utilization of this filter, perforation evaluation engine 110 includes all porosity and permeability value ranges that existed in a certain lithotype definition.

At block 204(iii), the perforation by distance from fluid boundary filter allows a user to restrict the creation of well perforations in a production or injection well based on a prescribed distance from a fluid phase boundary (i.e., water-oil or gas-oil contact, for example). In one exemplary embodiment, to apply this filter, a user would specify the depth of a particular or multiple fluid phase boundaries. Perforation evaluation engine 110 would then restrict the determination of the perforation intervals accordingly such that they are inclusive or exclusive of the defined depth restriction(s) depending on the hydrocarbon target. For production wells, this would prohibit the definition of a perforation below the water-oil contact, as well as ensure that the perforations are located in cells above oil saturation greater than residual oil saturation. For injection wells, it would be used to spatially restrict perforations created for water or gas injection, which would be contingent on the reservoir drive mechanism. As previously described, this filter may be defined via a suitable user interface and, thereafter, detected by perforation evaluation engine 110, whereby the necessary filter is then applied.

In addition, a perforation by dynamic fluid property filter may also be defined at block 204(iv). Such an exemplary filter would facilitate workflows involving history matching or the addition of new wells to a history matched dynamic model. In those embodiments addressing history matching, perforation evaluation engine 110 would conduct uncertainty assessment of multiple probable historically matched models based on an analysis of dynamic saturation and pressure profiles. In those embodiments addressing the addition of new wells to history matched dynamic models, perforation evaluation engine 110 utilizes, for example, volumes of oil, gas or water saturation, dynamic streamlines, static inter-well tortuosity rankings and residual saturation filtering (based on relative permeability and an initialized dynamic model) to assess dynamic ranking characteristic of the proposed new wells.

To perform the analysis after a perforation by dynamic fluid property filter has been defined, perforation evaluation engine 110 utilizes the pressure and/or saturation profiles resulting from a numerical flow model in a reservoir simulator as the criterion to assess existing or potential perforation intervals. Similar to the perforation by rock property filter, this filter allows a user to utilize a numerical data range constraint to identify where the well trace intersects with grid cells in the specified property volume, given that the cells belonging to the volume occur within the range specified by the dynamic property filter. In other words, cell volumes meeting this criterion must both intersect the well trace and contain the dynamic fluid property defined by the user in specified filter range.

The perforating by dynamic fluid property fluid is an enhancement to the aforementioned listed perforation filters, as those previously described are static in nature (i.e., time invariant properties). However, dynamic properties are time dependent, thus providing the user with the ability to update perforation intervals as a result of transitory behavior in the subsurface. Embodiments of perforation evaluation system 100 utilizing such a dynamic filter will facilitate reservoir prediction/forecasting by allowing users to, for example: model new (open) perforation intervals given agglomerated hydrocarbons in new locations resulting from a modeled production scenario, perform sensitivity analysis of potential perforation intervals locations given hydrocarbon accumulation proximal to the well trace, determine optimal perforation interval shut-in given fluid distribution and associated flow unit connectivity, and determine where re-perforation may be appropriate to exploit bypassed pay.

At block 204(v), the perforation by geobody filter utilizes geocellular connectivity in order to distinguish between the flowing and non-flowing conduits existing in saturated subsurface porous media. Here, the reservoir, or bulk medium, is categorized as containing static conduits of flow and barriers to flow, each being distinguishable by a magnitude of porosity/permeability. Some pore spaces are effectively connected between each other, thus constituting a flow region whereby single and/or multiphase flow is permitted. Barriers may also be interconnected, potentially rendering total obfuscation of a floodable pore space. As such, perforation evaluation system 100 utilizes a connectivity algorithm as described herein to analyze connected cells possessing petrophysical properties in order to assess the net reservoir volume, thus producing one or more reservoir regions of connected bodies, or geobodies, in the context of a porosity or permeability range (i.e., connectivity scores). A modified Euler Characteristic is utilized to evaluate and rank those geobodies based upon their cell connectivity, thus identifying a range of geological realizations that include, for example, optimistic, intermediate, and pessimistic geobodies. The location of one or more perforation intervals along a well trace may then be determined and ranked according to the connectivity scores. Accordingly, those geobodies and perforation intervals may then be realized in an earth model to simulate various downhole operations.

Flowing conduits consist of porosity and permeability within a range that, for given fluid properties, permit the transport of those fluids. Non-flowing conduits, as a corollary, act as barriers/inhibitors to fluid flow in the rock matrix, although it may possess trapped/immobile hydrocarbons. In this regard, the geobody filter quantifies the static connectivity for a specific petrophysical earth model having grid volumes of porosity and permeability, and utilizes the Euler Characteristic as a ranking tool for connected geocellular bodes of multiple stochastic realizations. In addition, an inverse cumulative distribution function ("ICDF") may be utilized to interpret probabilities of occurrence.

In other words, those embodiments utilizing the perforation by geobody filter topologically assesses the appropriateness of specific static model advancement to dynamic simulation. The modified Euler Characteristic is utilized to enhance the topological assessment by numerical quantifying the connectivity of cells within a static reservoir model over a range of porosity and permeability values (i.e., connectivity scores). Based on this quantification, perforation evaluation engine 110 ranks the connectedness of disparate earth modeling petrophysical realizations, or geobodies. Thereafter, static determination of optimally connected geobodies is determined by perforation evaluation engine 110, wherein the location of one or more perforation intervals are then determined along a defined well trace. Ultimately, the resulting static reservoir model is subjected to fluid flow simulation for further analysis as desired.

Nevertheless, at block 206, after one or more perforation filters have been detected, perforation evaluation engine 110 then analyzes the reservoir model to determine the location of one or more perforation intervals based upon the defined perforation filters. As stated above, in doing so perforation evaluation engine 110 will traverse the model to identify those cells that intersect the well trace and that meet the criteria defined in the perforation filters. At block 208, perforation evaluation engine 110 then outputs the resulting perforation intervals accordingly. The perforation filters may be output in a variety of ways, such as, for example, using a 3D reservoir model. In addition, the modeled perforation filters may then be utilized in a dynamic simulation, as understood in the art. As such, exemplary embodiments of the present invention facilitate faster assessment of allocating perforations and advantageously considering well communication through static properties before perforating the well and progressing to full-field flow simulation. These and other modifications of the present invention will be readily apparent to those ordinarily skilled in the art having the benefit of this disclosure.

In the exemplary methodology described above, in those instances in which the perforation by geobody filter is entered, perforation evaluation engine 110 utilizes one or more geobodies that were previously generated by the system. In other words, perforation evaluation system 100 did not require the user to define the geobody. However, in other exemplary methodologies, perforation evaluation engine 110 may prompt the user to define the geobody using a variety of "geobody filters." An exemplary methodology to generate and utilize such geobodies is described below. In addition, those ordinarily skilled in the art having the benefit of this disclosure will also realize that the descriptions provided below may also be utilized to generate geobodies for application in a variety of other applications.

Figure 3A:
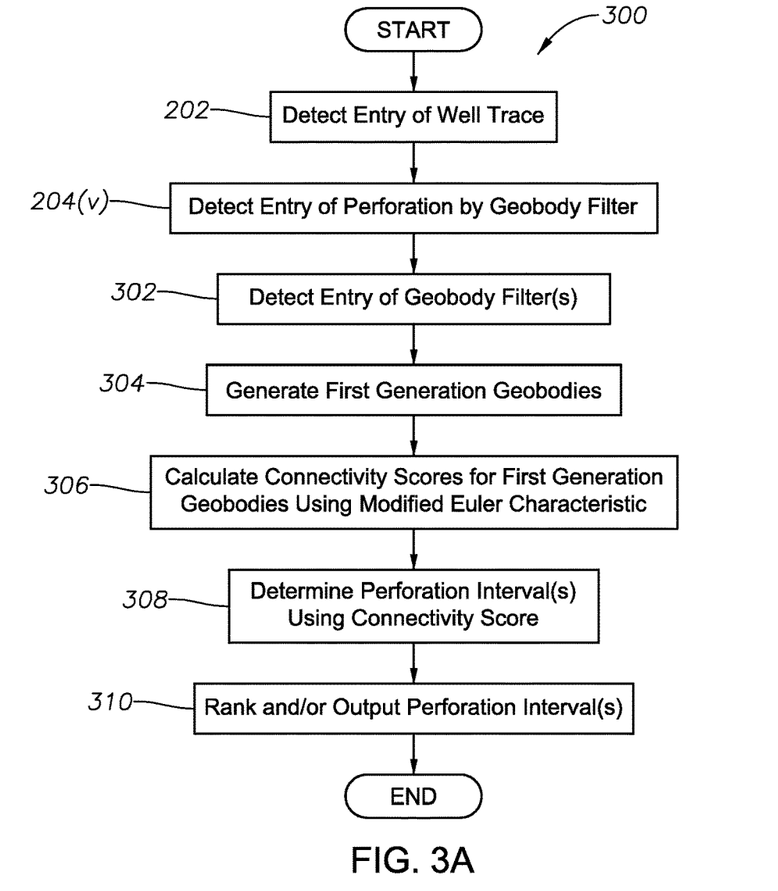
FIG. 3A illustrates a method for determining the location of perforation intervals using a perforation by geobody filter, according to certain exemplary methodologies of the present invention.

Accordingly, FIG. 3A is a flow chart illustrating yet another exemplary methodology 300 of the present invention wherein the perforation by geobody filter has been detected by perforation evaluation engine 110. As shown, blocks 202 and 204(*v*) operate as previously described in relation to FIG. 2. Once the perforation by geobody filter has been detected at block 204(*v*), perforation evaluation engine 110 detects entry of one or more geobody filters defined using a characteristic of a desired geobody at block 302. Such geobody characteristics may be, for example, related to petrophysical, mechanical, geometric, or volumetric properties. The geobody filters may be entered, or defined, via a user interface (display 108 and I/O device 106, for example), as understood in the art. In an exemplary embodiment, the geobody filters may define (1) a numerical range of porosity values that cells within the reservoir grid must meet to be eligible to form part of a geobody, (2) a numerical range of permeability values cells must meet in order to be eligible to form part of the geobody, (3) a minimum number or total pore volume of connected cells that a geobody must have, and (4) a required cell connection geometry for the geobodies.

Regarding exemplary filters (1) and (2), perforation evaluation system 100 utilizes the specification of respective porosity and permeability ranges for the interrogation of cell connectivity in an earth model in order to identify and isolate those geobodies having reservoir properties that are to be exploited. Exemplary porosity/permeability ranges may include, for example, porosity in the range of 0.25 pore units (or 25%) to 0.35 pore units (or 35%) or permeability in range of 200 mD (milli-Darcy) to 1.5 D (Darcy), as will be understood by those ordinarily skilled in the art having the benefit of this disclosure. In other exemplary embodiments, perforation evaluation system 100 may also utilize specifications of other properties to determine connectivity, such as, for example, facies, TOC, brittleness, Poisson's ratio, or any individual or combination of indicator or continuous variable (e.g., mechanical, petrophysical, or lithotype), as would be understood by those same skilled persons.

As reflected in geobody filter (3), another exemplary specification is that of the minimum connected cell count or total pore volume necessary to constitute a geobody. As previously described, as a result of the porosity/permeability geobody filter, isolated sets of range inclusive geobodies may be created. In such embodiments, if those geobodies are separated by an impermeable barrier (remaining truly isolated), they would not contribute to fluid flow (or oil and gas production). In addition, such geobodies are likely to be very trivial in fluid volume. To remedy such erroneous creation of isolated reservoir geobodies, certain exemplary embodiments of perforation evaluation system 100 utilize a minimal connected cell count or total pore volume constraint as a filter to exclude small-isolated geobodies from the selection process and, thus, prevent them from hindering proper assessment of grid connectivity. For example, a 100 cell threshold may be utilized as the geobody filter and, in such case, those connected cell volumes having less than 100 cells are discarded. In another example, a volume of $8.2 \times 10^6$ m3 (cubic meters) may be used as the geobody filter and, in such case, those connected cells with total pore volume having less than $8.2 \times 10^6$ m3 are discarded. Accordingly, through entry of this geobody filter, perforation evaluation system 100 analyzes the reservoir grid to determine those geobodies comprised of cells in the amount of the minimum connected cell constraint, by count or total pore volume. In those embodiments wherein the porosity/permeability geobody filter is also entered, cells recognized by processor 102 as possessing porosity/permeability within the given range yet lacking sufficient cell connectivity as per the minimum cell constraint are considered non-net reservoir (i.e., will not be selected as geobodies).

Figure 3B:
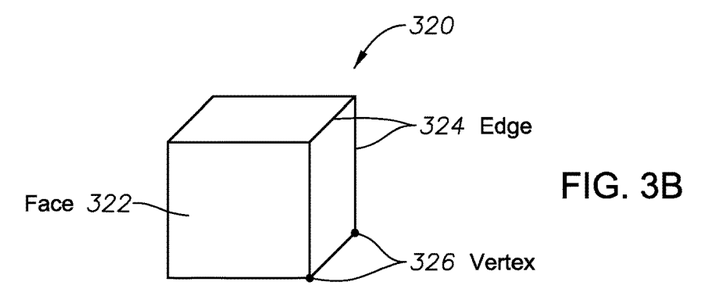
FIG. 3B is an exemplary cell contained within a geological grid of a reservoir model, for illustration purposes.

Still referring to block 302, using a fourth exemplary geobody filter, the connected cells may be defined in terms of their geometry. As understood in the art, conjoined cells in a reservoir model grid may be connected by vertices, edges and faces. The geometric grid is typically stacked in rectilinear/structured sets—i.e. in Cartesian or pseudo-Cartesian space, accounting for stratigraphy and displacement attributed to faulting. To illustrate this feature, FIG. 3B illustrates an exemplary cell 320 being comprised of six faces 322, twelve edges 324 and eight vertices 326 (or corner-point connections). The stacked cell connectivity to be utilized by perforation evaluation engine 110 is then determined by defining how or if adjacent faces 322, edges 324 and vertices 326 are connected to one another in the entire volume or specified three-dimensional zone of interest. For example, the defined geobody filter may require that only edges and vertices be connected, thus those cells not so connected are discarded. However, in other embodiments, one or more geometrical connectivity geobody filters may be utilized alone or in combination. The function and operation of such geometric connectivity algorithms will be understood by those ordinarily skilled in the art having the benefit of this disclosure. Once the cell geometry has been defined, processor 102 utilizes earth modeling module 114 to traverse the reservoir grid by incrementing along the X axis, then incrementing along the Y axis and then by incrementing along the Z axis cell by cell, establishing whether the necessary cell connections exist, as will be understood by those persons ordinarily skilled in the art having the benefit of this disclosure.

Figure 3C:
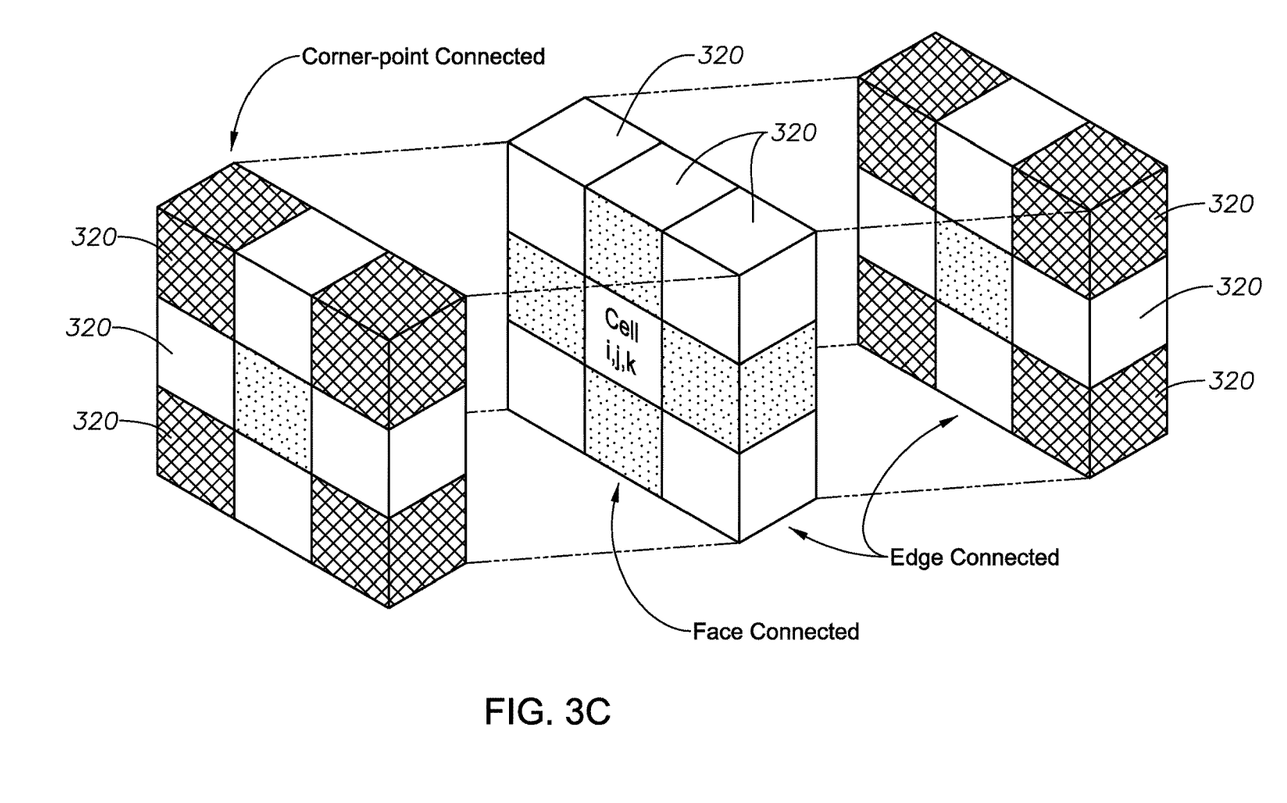
FIG. 3C is a series of stacked cells contained within a geological grid of a reservoir model, for illustration purposes.
Figure 3D:
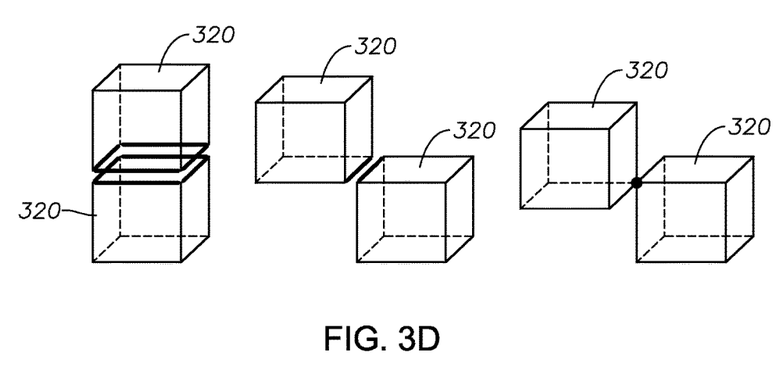
FIG. 3D is an illustration of exemplary geometric cell connections, for illustration purposes.

Therefore, subsurface cell connections may be manifested as face-to-face, edge-to-edge and vertex-to-vertex. To illustrate this feature, FIG. 3C demonstrates stacked cells 320 and their interconnectedness that would be assessed for a central cell (i,j,k) within a reservoir grid, as described in Deutsch, C.; *Fortran Programs for Calculating Connectivity of Three-Dimensional Numerical Models and for Ranking Multiple Realizations*; Computers & Geosciences, Vol. 24, No. 1, pp. 69-76, 1998). In certain exemplary embodiments of perforation evaluation system 100, connectivity may be determined from any permutation or exclusive implementation of face, edge or vertex based connectivity between cells 320 within a given volume of the reservoir grid. FIG. 3D illustrates three exemplary respective geometric connectivity methods for cells 320, A showing face-to-face, B showing edge-to-edge, and C showing vertices-to-vertices, as described in Zhang, M., Yonigjia, H., Ye, G., Lange, D. and van Breugel, K.; *Computational investigation on mass diffusivity in Portland cement paste based on X-ray computed microtomography (µCT) image; Construction and Building Materials*, Vol. 27, Issue 1, pp. 472-481, 2012). The connectivity algorithm and connection configurations utilized by processor 102 to achieve this functionality may be, for example, those as described in Deutsch, C.; *Fortran Programs for Calculating Connectivity of Three-Dimensional Numerical Models and for Ranking Multiple Realizations*; Computers & Geosciences, Vol. 24, No. 1, pp. 69-76, 1998. However, those ordinarily skilled in the art having the benefit of this disclosure realize there are a variety of other connectivity methodologies which may be utilized with the present invention.

Figure 3E:
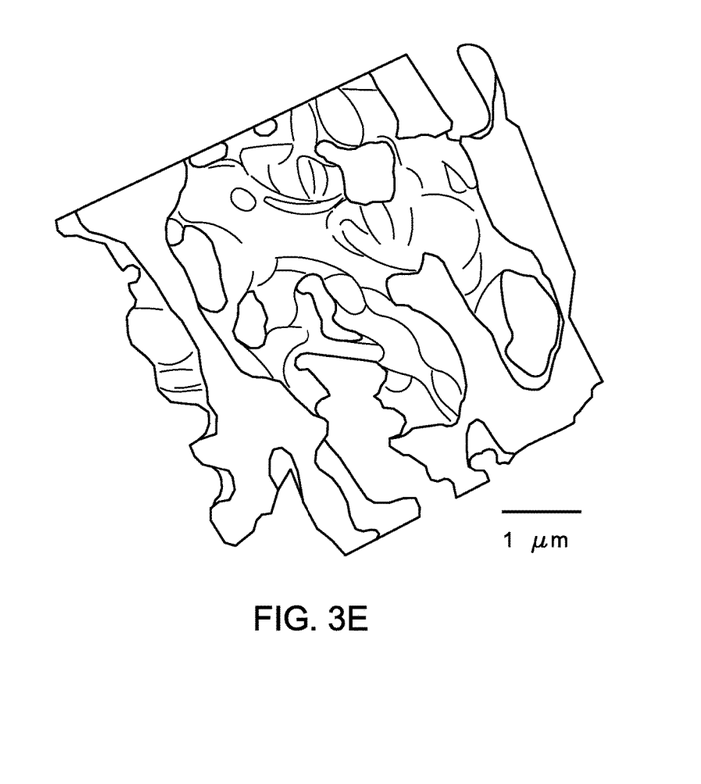
FIG. 3E illustrates a connected subset pore scale (micrometers) volume derived from segmentation of Environmental Scanning Electron Microscope images, for illustration purposes.

Still referring to block 302 of FIG. 3A, once entry of one or more of the geobody filters described herein are detected by perforation evaluation system 100, perforation evaluation engine 110 then generates one or more first generation geobodies based upon the defined geobody filters at block 304. To do so, perforation evaluation system 100 assigns a new index (a unique numerical number) to those cells comprising the characteristic properties expressed by the user (i.e., geobody filters). After the index is assigned to the qualifying cells, perforation evaluation engine 110 makes each cell part of a connected net reservoir group (or, geobody). In those instances where two disparately indexed geobody groups are determined to be connected, perforation evaluation engine 110 re-indexes geobody groups to become a part of the same geobody numerical index. The end result is a collection of geobodies and remaining non-net reservoir cells. FIG. 3E illustrates an exemplary connected pore volume index for a membrane at micro-meter scale (obtained through microCT segmentation, for example), with the non-connected field being omitted from the display, as described in Polt, P.; *In situ experiments in the ESEM (Environmental Scanning Electron Microscope)*; Austrian Centre for Election Microscopy and Nanoanalysis, Retirved Jun. 5, 2012. For a thoroughly homogeneous structure, it is expected that a solitary geobody would exist for the given earth model. However, earth models characterized by more heterogeneity are expected to contain multiple collections of potential net reservoir, as will be understood by those ordinarily skilled in the art having the benefit of this disclosure.

At block 306, perforation evaluation engine 110 then calculates a connectivity score for each of the first generation geobodies. In one exemplary embodiment, a Euler Characteristic is utilized to assign a numerical quantification, or connectivity score, to each geobody correlating to rock physics or mechanical rock property. As will be understood by those ordinarily skilled persons having the benefit of this disclosure, a Euler Characteristic is a non-dimensional number that may be negative or positive. It is defined as:

$$\chi(G) := V - E + F \qquad \text{Eq. (1)}$$

where, in the classical terms of a well-defined porous medium G, V is defined as the number of connected components of G (pores), E is the number of tunnels in G (number of redundant connections within the pore space), and F is the number of enclosed cavities (occluded pore space), as described in Vogel, H. J.; *Topological Characterization of Porous Media*; in K. R. Mecke, D. Stoyan (Eds.), LNP 600, pp. 75-92, 2002. Conventional application of Euler Characteristic takes place in binary porous media systems or pore network models, which are systems defined as either pore (with established pore throat connections) or solid, uncommon to that present in reservoir simulations whereby a given pore space may be intermediate in its porosity, thus not truly qualifying as a pore or solid, but possessing varying degrees of solid and void space.

Accordingly, to remedy this shortcoming of conventional approaches, certain exemplary embodiments of the present invention as described herein produces a quasi-binary reservoir system that is comprised of connected and non-connected pore spaces defined by petrophysical data cutoffs (geobody filters, as previously described). To achieve this quasi-binary system, one or more exemplary embodiments of the present invention utilize a modified Euler Characteristic. To describe the modified Euler Characteristic, again note that the geobodies defined by the applied static connectivity filters (block 302) act as the connected pore space in the Euler equation. Thus, V is now expressed as:

$$\{\forall \varphi, K | g_0 < \varphi < g_1, f_0 < K < f_1; g(0,1), f \in S; S \in R^1\}, \qquad \text{Eq. (2)}$$

with $\varphi$ defined as the porosity, K defined as the permeability, g and f are real porosity and permeability value ranges defined by the user in the static connectivity geobody filter for the static grid S. The minimum count and total pore volume of connected cells defined in the filter is expressed as:

$$\min_{i \in G} \Sigma i \qquad \text{Eq. (3a)}$$

and $$\min_{i \in G} \Sigma v(i) \qquad \text{Eq. (3b)}$$

where G is the static model, i is an individual cell in G, and v(i) is the total pore volume of an individual cell in G. The cell connection constraint is governed by, for example, 6, 8, 12, 14, 18, 20 or 26 point geometrical cell connections established by permutations of face, edge and vertex connectivity in the volume. Perforation evaluation engine 110 assesses the redundant connections during the static connectivity process (block 304). Perforation evaluation engine 110 considers connections to be redundant when at least one dependent connection exists that allows fluid entry and exit from a cell (i.e. mass is conserved and non-dependent connections are redundant). An abundance of redundant connections is therefore interpreted as healthy connectedness of the volume.

The final term in the Euler Characteristic (Eq. (1)) is the occluded non-solid reservoir space, represented as an F, which is the portion of porosity omitted by the petrophysical constraint of the static connectivity geobody filter. The cell(s) found to be isolated are then included in the assessment of reservoir connectivity. However, in an alternative embodiment, the isolated cell(s) may also be treated as a solid rock matrix (i.e. omitted per the defined geobody filter, thus indicating it does not participate in flow), which is dependent on the defining capillary pressure and relative permeability that may be assigned to the cells during dynamic flow simulation in a numerical reservoir simulator.

Still referring to block 306 of FIG. 3A, utilizing the modified Euler Characteristic as defined above, perforation evaluation engine 110 calculates and assigns a numerical quantification indicating the connectivity for each geobody, also referred to herein as a connectivity score. In an exemplary embodiment, largely connected geobodies are attributed with a more negative Euler Characteristic, while the opposite exists for less connected geobodies. For example, a largely connected geobody may be assigned a connectivity score of −2500, an intermediate connected geobody assigned a connectivity score of −0.45, and a poorly connected geobody assigned a connectivity score of 2500, depending on the volume of the initial reservoir grid and the determined geobodies, respectively.

As will be understood by those ordinarily skilled in the art having the benefit of this disclosure, when the modified Euler Characteristic is normalized by volume it yields the Euler Number—i.e. a numerically quantified connectivity without the effect of the volume. In such embodiments, the connected portions of porosity constitute the flow region while the solid matrix, or zones possessing an excessively high entry pressure, act as barriers to flow and thus connectivity. The same is analogous to porosity and permeability cutoffs in the reservoir which delineate the flow region of the reservoir. Thus, this feature of the present invention accounts for the understanding that, while petrophysical property realizations may be equiprobable in their gross spatial distribution of porosity and permeability, the actual flow region(s) constituted by rock type spatial distribution/placement and inter-connection should be analyzed in isolation with respect to a solitary grid. Thereafter, at block 308, perforation evaluation engine 110 determines the optimal location for one or more perforation intervals along the defined well trace suing the connectivity scores.

Moreover, by quantifying static connectivity, it is possible to rank petrophysical property realizations in terms of that connectivity, which is described by porosity and permeability cutoffs in the net reservoir. As a result, the connectivity of the geobodies (i.e., connectivity score), and perforation intervals along the well trace, can be quantified and ranked as well. Accordingly, at block 310, perforation evaluation engine 110 ranks the first generation geobodies in relation to one another based on their connectivity scores. Thus, by incorporating the validation of inter-well (between injector/producer geobodies, for example) communication through fast streamline simulation or ranking inter-well communication through streamline simulation or static rock-type geobody based on tortuosity quantification, the perforation intervals may be evaluated individually or as a group for a given well trace. For example, non-dimensional values of tortuosity equal to, or slightly above one, may denote preferential connections as the tortuosity of a straight line is equal to one. In such embodiments, perforation evaluation engine 110 graphically analyzes the amount of preferential rock properties in contact with the perforation intervals defined along the well trace as described herein, and then utilizes, for example, a 3D tornado plot to visualize reservoir accordingly. Such a tornado plot may be defined vertically by K layer, horizontally by the azimuth of the static model, and quantified according to any available static or dynamic property volume, as will be understood by those ordinarily skilled in the art having the benefit of this disclosure.

In addition, at block 310, perforation evaluation engine 110 may output the well trace, geobodies and perforations, and/or presented them to a dynamic simulator for modeling of a variety of reservoir applications such as, for example, as a target for well planning or well drilling. Perforation evaluation system 100 may output the well trace, geobodies and perforation intervals in a variety of forms such as, for example, positioning each geobody and perforation along the well trace within a 3D earth model, or via a textual description of the same.

In an alternative methodology, perforation evaluation system 100 may also utilize the ranked geobodies to determine the probability of locating a third geobody that is similar to one or more of the ranked geobodies. Here, for example, perforation evaluation engine 110 may utilize an ICDF to determine P10, P50 and P90 probabilistic realizations. It should be noted that the most likely realization defined by static connectivity may differ from that based on static volumetric calculations. Due to the petrophysical property realizations being equiprobable, large variations of in-place fluids are not expected in most examples. This leads to minor variations in the computed in-place fluids. In such exemplary methodologies, the modified Euler Characteristic is utilized to measure the effect of petrophysical property spatial distribution between specific wells and throughout the entire reservoir model, which varies more widely from realization to realization. Thus, through use of the present invention, the modified Euler Characteristic may be used in conjunction with traditional static volumetric ranking methods to further rank multiple stochastic realizations generated from traditional earth modeling processes.

Figure 4:
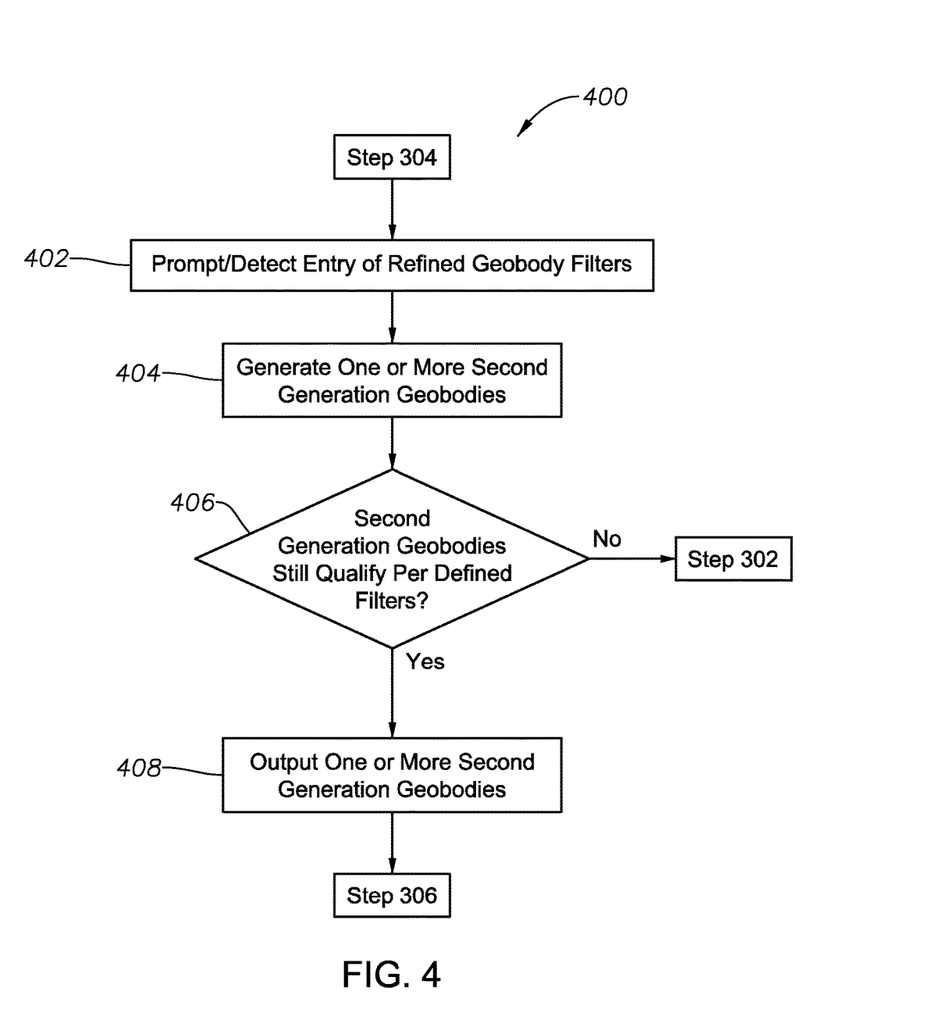
FIG. 4 illustrates an exemplary method for refining geobody determination according to prescribed filtering criterion by certain exemplary methodologies of the present invention.

FIG. 4 is flow chart illustrating yet another exemplary methodology perform using one or more embodiments of the present invention. Methodology 400 begins at block 304 of the methodology 300 described in relation to FIG. 3A above. However, in an alternative embodiment, processor 102 may continuously run method 400 in the background in order to continuously detect entry of refined geobody filters. Nevertheless, in the methodology of FIG. 4, after generating the first generation geobodies, perforation evaluation engine 110 prompts a user via the interface to enter one or more refined geobody filters at block 402. The refined geobody filters (as described previously) may loosen or restrict the connectivity requirements necessary for cells to form geobodies. In the alternative, however, perforation evaluation engine 110 may utilize an iterative loop to continuously monitor the system for entry of refined geobody filters. In either embodiment, perforation evaluation engine 110 utilizes a dilation/erosion technique to refine any of the rock property, the minimum cell constraint and/or topology. Here, dilation/erosion would be used to determine potential agglomeration (e.g., expansion or shrinkage) of disparate geobodies through connectivity via cells lacking the pass criterion of the petrophysical geobody filters. Thus, the present invention takes into account the assumption that, for spatially distinct geobodies, the uniqueness of distinct geobodies may be entirely trivial if the amount of cells separating them is very low (topological consideration) or if flow is expected to occur in the particular system due to effects of capillarity (dynamic consideration).

Upon specifying a refined geobody filter, perforation evaluation engine 110 uses the dilation/erosion technique to determine if cell volumes adjacent the geobodies are actually conjoined solitary volumes with petrophysical heterogeneity. As a result, the geobodies may be expanded or shrunk. To achieve this functionality, a volume of examination criterion, possessing dimensions defined by height, width and length, would be specified by a user of the system. Perforation evaluation engine 110 would then utilize the examination volume to search adjacent, but non-connected geobody(ies) or cells, residing proximal to a given geobody within the reservoir grid. Should a connection be established through a volume of examination, perforation evaluation engine 110 determines that the respective geobodies are conjoined as a solitary geobody. Thereafter, at block 404, perforation evaluation engine 110 proceeds with the erosion process to reconfigure/re-index those geobodies determined to be connected as a solitary unique geobody (i.e. aggregating the net reservoir volume, and subsequently deleting the volume of examination), also referred to as the creation of second generation geobodies. Those ordinarily skilled in the art having the benefit of this disclosure will realize there are a variety of dilation/erosion techniques which may be employed herein.

At block 406, perforation evaluation engine 110 then re-analyzes the one or more second generation geobodies to determine if they still meet the requirements defined by the geobody filters entered at block 204. However, in the alternative, perforation evaluation engine 110 may also utilize an iterative loop to continuously monitor the system for input of refined geobody filter parameters. In such alternative embodiments, perforation evaluation engine 110 would determine if the second generation geobodies meet the definition of the newly inputted geobody filters. Nevertheless, if at block 406 it is determined that one or more of the geobodies do not meet the geobody filter criteria, the algorithm loops back to step 302. However, for those geobodies that do meet the geobody filter criteria, the algorithm goes on to block 408 wherein the geobodies are output as previously described. Thereafter, the algorithm loops back to block 306 whereby the second generation geobodies are utilized to determine the perforation intervals as previously described.

In one or more alternate embodiments of the present invention, perforation evaluation engine 110 may also evaluate and determine the inlet to outlet static connections between an injector/producer well pair that is connected through determined geobodies. Enforcing inlet/outlet conditions provide a process by which connectivity can be assessed with the a priori assumption of potential communication between wells. Such exemplary embodiments would permit the determination of dependent connectivity from a source to a sink, much like a streamline. Independent connectivity would remain as defined previously by the filtered petrophysical, volumetric and geometrical components. However, in this alternative embodiment, the injector well would act as a start point and the producer as the end point. Perforation evaluation engine 110 would then initiate the previously described connectivity algorithms from the injection well, as opposed to simply following the increasing X, Y and Z coordinates in the grid. In addition, such an embodiment would allow for the combined analysis of interpreted well test permeability and earth modeled interpreted flow regions based primarily on petrophysical analysis.

As such, exemplary embodiments of the present invention faciliate faster assessment of allocating perforations and advantageously considering well communication through static properties before perforating the well and progressing to full-field flow simulation. These and other modifications of the present invention will be readily apparent to those ordinarily skilled in the art having the benefit of this disclosure.

The foregoing methods and systems described herein are particularly useful in planning, altering and/or drilling wellbores. As described, the system utilizes one or more perforation filters to identify optimal perforation intervals along a defined well trace within a reservoir model. Thereafter, a wellbore may be simulated, planned and perforated using the determined perforation intervals, an existing wellbore may be perforated in real-time and/or further operations may be altered. In addition, well equipment may be identified and prepared based upon the well placement or stimulation plan, and the wellbore is drilled, stimulated, altered and/or completed in accordance to the well placement or stimulation plan.

The present invention provides a variety of advantages. First, it allows the perforation of wells for the purpose of executing a flow simulation using non-esoteric methods. Second, the present invention provides optimization of perforation intervals since flow regions are assessed earlier using static properties, thus saving money. Third, time and money may be saved by gaining an understanding of reservoir flow regions earlier, through their petrophysical properties, and in conjunction with dynamic property modeling. Fourth, static models may be refined based upon determined communication between wells and sector/regional fluid displacement exclusively using static properties. Fifth, the static earth model may be adjusted to be consistent with production data. Sixth, fine tuning of the static model is encouraged before flow simulation, thus reducing the necessity to introduce porosity/permeability modifiers in the model during history match. Seventh, effective permeability may potentially be computed using flow simulation or the Kozeny-Carman equation as an estimation, and then comparing the results to formation permeability and fluid storage capacity. Eight, history matching is more accurate, thus honoring geostatistics and production data. Lastly, connectivity quantification and ranking of earth models is provided.

An exemplary methodology of the present invention provides a computer-implemented method to determine placement of a perforation interval along a well trace, the method comprising detecting entry of a well trace defined within a reservoir model; detecting entry of one or more perforation filters defining at least one of a: perforation interval by facies; perforation interval by fluid boundary; perforation interval by geobody; or perforation interval by dynamic fluid property; and determining a location of one or more perforation intervals along the defined well trace based upon the entered one or more perforation filters. In another, the one or more perforation intervals are utilized within a planned well or an existing well. In yet another, the entered perforation filter defines the one or more perforation intervals by geobody, and determining the location of the one or more perforation intervals further comprises detecting entry of one or more geobody filters defined using one or more characteristics of a desired geobody; generating a plurality of first generation geobodies based upon at least one of the geobody filters; calculating a connectivity score for each first generation geobody using a Euler Characteristic; and determining the location of one or more perforation intervals along the define well trace using the connectivity scores of each first generation geobody.

In another, the method further comprises ranking the perforation intervals based upon the connectivity scores of each first generation geobody. In yet another, the connectivity score calculated using the Euler Characteristic comprises numerical ranges of rock physics or mechanical rock properties. In another, the one or more geobody filters comprise at least one of: a range of porosity for a cell forming part of the first generation geobodies; a range of permeability for a cell forming part of the first generation geobodies; a minimum count or total pore volume of connected cells for the first generation geobodies; or a cell connection geometry for the first generation geobodies.

In yet another, the method further comprises detecting entry of one or more refined geobody filters and generating at least one second generation geobody based upon the refined geobody filters. In another, generating the second generation geobody further comprises: generating a first volume of cells based upon the refined geobody filters; performing a dilation/erosion technique to determine if the first volume of cells should be expanded or shrunk; and generating a second volume of cells based upon the determination of whether the first volume of cells should be expanded or shrunk, wherein the second volume of cells is the second generation geobody.

Another exemplary methodology of the present invention provides a computer-implemented method to determine placement of a perforation interval, the method comprising determining a location of a perforation interval along a well trace using a perforation filter defining at least one of a perforation interval by facies, perforation interval by fluid boundary, perforation interval by geobody or perforation interval by dynamic fluid property. In another, a location of the well trace is defined before the location of the perforation interval is determined. In yet another, the perforation filter defines a perforation by geobody, and determining the location of the perforation interval further comprises generating a plurality of first generation geobodies; calculating a connectivity score for each first generation geobody; and utilizing the connectivity scores to determine the location of a plurality of perforation intervals.

In yet another, calculating the connectivity scores further comprises utilizing a Euler Characteristic to calculate a numerical range of rock physics or mechanical rock properties. In another, the perforation interval is utilized in a planned well or an existing well. In yet another, the method further comprises ranking the plurality of perforation intervals based upon the connectivity scores.

Furthermore, the exemplary methodologies described herein may be implemented by a system comprising processing circuitry or a computer program product comprising instructions which, when executed by at least one processor, causes the processor to perform any of the methodology described herein.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A computer-implemented method to determine placement of a perforation interval along a well trace, the method comprising:
    simulating a reservoir model using data obtained from a database module coupled thereto;
    detecting entry of the well trace defined within the reservoir model;
    detecting entry of one or more perforation filters defining at least one of a:
        perforation interval by fluid boundary; or
        perforation interval by dynamic fluid property;
    determining a location of one or more perforation intervals along the defined well trace based upon the entered one or more perforation filters, wherein the entered perforation filter further defines the one or more perforation intervals by geobody, and determining the location of the one or more perforation intervals further comprises:
        detecting entry of one or more geobody filters defined using one or more characteristics of a desired geobody;
        generating a plurality of first generation geobodies based upon at least one of the geobody filters;
        calculating a connectivity score for each first generation geobody using a Euler Characteristic, wherein the Euler Characteristic is based on a quasi-binary reservoir system comprised of connected and non-connected pore spaces; and
        determining the location of one or more perforation intervals along the defined well trace using the connectivity scores of each first generation geobody; and
    perforating a wellbore according to the determined perforation intervals.

2. A computer-implemented method as defined in claim 1, wherein the one or more perforation intervals are utilized within a planned well or an existing well.

3. A computer-implemented method as defined in claim 1, further comprising ranking the perforation intervals based upon the connectivity scores of each first generation geobody.

4. A computer-implemented method as defined in claim 1, wherein the connectivity score calculated using the Euler Characteristic comprises numerical ranges of rock physics or mechanical rock properties.

5. A computer-implemented method as defined in claim 1, wherein the one or more geobody filters comprise at least one of:
    a range of porosity for a cell forming part of the first generation geobodies;
    a range of permeability for a cell forming part of the first generation geobodies;
    a minimum count or total pore volume of connected cells for the first generation geobodies; or
    a cell connection geometry for the first generation geobodies.

6. A computer-implemented method as defined in claim 1, further comprising:
    detecting entry of one or more refined geobody filters; and
    generating at least one second generation geobody based upon the refined geobody filters.

7. A computer-implemented method as defined in claim 6, wherein generating the second generation geobody further comprises:
    generating a first volume of cells based upon the refined geobody filters;

performing a dilation/erosion technique to determine if the first volume of cells should be expanded or shrunk; and generating a second volume of cells based upon the determination of whether the first volume of cells should be expanded or shrunk, wherein the second volume of cells is the second generation geobody.

8. A system comprising processing circuitry to implement the method in claim 1.

9. A computer program product comprising instructions which, when executed by at least one processor, causes the processor to perform the method in claim 1.

10. A computer-implemented method to determine placement of a perforation interval, the method comprising:

simulating a reservoir model using data obtained from a database module coupled thereto;

determining a location of a perforation interval along a well trace using a perforation filter defining at least one of a:

perforation interval by fluid boundary; or perforation interval by dynamic fluid property, wherein the entered perforation filter further defines the one or more perforation intervals by geobody, and determining the location of the one or more perforation intervals further comprises:

detecting entry of one or more geobody filters defined using one or more characteristics of a desired geobody;

generating a plurality of first generation geobodies based upon at least one of the geobody filters;

calculating a connectivity score for each first generation geobody using Euler Characteristic, wherein the Euler Characteristic is based on a quasi-binary reservoir system comprised of connected and non-connected pore spaces; and determining the location of one or more perforation intervals along the defined well trace using the connectivity scores of each first generation geobody; and perforating a wellbore according to the determined location of the perforation intervals.

11. A computer-implemented method as defined in claim 10, wherein a location of the well trace is defined before the location of the perforation interval is determined.

12. A computer-implemented method as defined in claim 10, wherein the perforation interval is utilized in a planned well or an existing well.

13. A computer-implemented method as defined in claim 10, further comprising ranking the plurality of perforation intervals based upon the connectivity scores.

* * * * *